Figure 1:
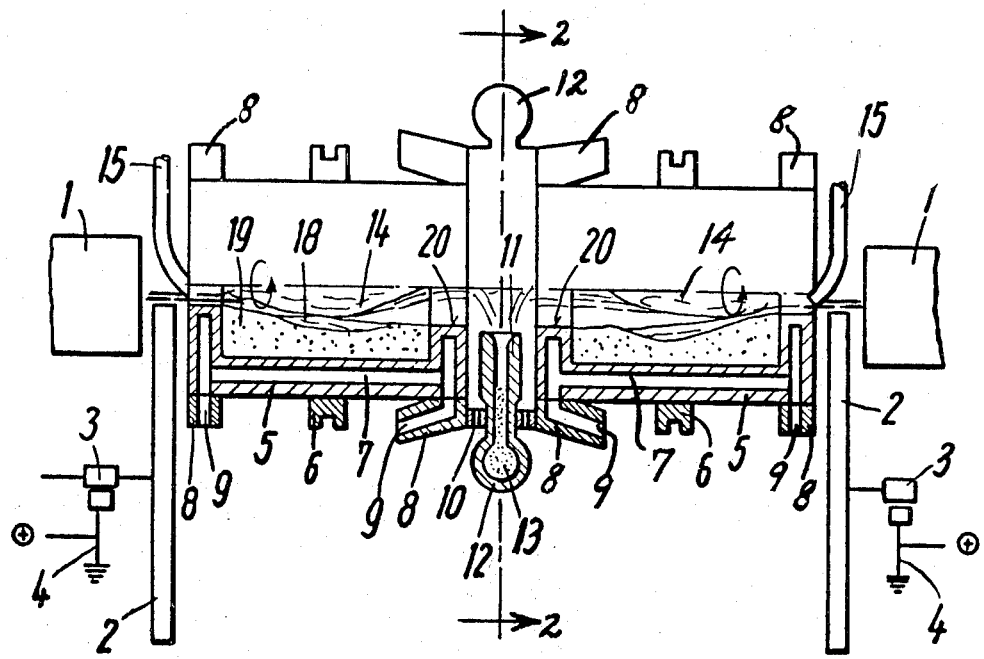

United States Patent [19]
Kugler

[11] 3,869,254
[45] Mar. 4, 1975

[54] APPARATUS FOR CARRYING OUT HIGH TEMPERATURE REACTIONS

[75] Inventor: Tibor Kugler, Sins, Switzerland

[73] Assignee: Lonza, Ltd., Gampel, Valais, Switzerland

[22] Filed: Oct. 12, 1972

[21] Appl. No.: 299,876

Related U.S. Application Data

[62] Division of Ser. No. 68,628, Sept. 1, 1970, Pat. No. 3,705,006.

[52] U.S. Cl............... 23/262, 23/252 R, 23/277 R, 23/284, 423/659, 423/608, 219/121 P, 13/10, 250/543, 250/547
[51] Int. Cl............................. B01j 1/00, C01g 1/00
[58] Field of Search....... 23/262, 252 R, 277 R, 278, 23/264; 423/659, 608; 219/121 R; 250/542, 543, 544–547; 13/9, 10

[56] References Cited
UNITED STATES PATENTS
3,239,593  3/1966  Maier et al. .............................. 13/9

Primary Examiner—James H. Tayman, Jr.
Attorney, Agent, or Firm—Brady, O'Boyle & Gates

[57] ABSTRACT

Device for carrying out high temperature reactions which take place with a supply of energy which produces the temperature required for the reaction to take place. The reaction is carried out in a two-part reaction chamber with the reaction components flowing in opposite directions to a separation gap, and the reaction products are chilled and removed at the separation gap by means of a flow component forced into a direction perpendicular to the axis of the reaction chamber.

3 Claims, 2 Drawing Figures

PATENTED MAR 4 1975 3,869,254

APPARATUS FOR CARRYING OUT HIGH TEMPERATURE REACTIONS

This is a division of application Ser. No. 68,628, filed Sept. 1, 1970, now U.S. Pat. No. 3,705,006, issued Dec. 5, 1972.

This invention relates to a device for carrying out high temperature reactions which take place with a supply of energy, wherein the temperature needed for the reaction is produced by the supplied energy, and the reaction products are chilled.

It is known in the prior art to carry out high temperature reactions, e.g., dissociations or the formation of refractory compounds in a stream of hot gas or plasma. A reaction vessel which preferably rotates is used for carrying out the reaction to which energy is supplied by the stream. The walls of the reaction vessel can be cooled so that a part of the reactants or the end product "freezes" on the walls and forms a protective lining. This produces better thermal insulation and improved protection for the walls against chemical action. These reaction vessels are formed so that the energy source and the reaction components are fed in at one side largely in an axial direction. On the other side the end product is chilled and withdrawn axially. The exit aperture is usually larger than the inlet aperture for the energy source and the reaction components. Chilling is aided by shortening the mixing path between the reaction products and the chilling medium, which is usually introduced radially as a gas or liquid. For a given necessary chilling rate the output level is thus limited. In addition the loss of energy by radiation through the outlet aperture is relatively high with these known methods.

U.S. Pat. No. 3,275,412, discloses apparatus for carrying out high temperature reactions consisting of plasma torches inclined to one another at an angle of 70°–120°. In this patent specification it is stated that with plasma torches inclined to one another at an angle of 180°, such heavy deposits of solidified titanium dioxide were formed within 62 hours in front of the centrally disposed separation gap that the reaction had to be discontinued. This is considered specially disturbing, since with the higher degree of mixing of the reaction components by virtue of the strong interaction of the plasma streams at angles above 160°, a greater yield can be achieved.

The present invention aims to remove these known disadvantages. Accordingly, the present invention provides apparatus for carrying out high temperature reactions which take place with a supply of energy which provides the temperature required for the reaction, comprising two plasma generators including a two-part reaction chamber in which the reaction components flow in opposite directions toward a separation gap, located intermediate the ends of the reaction chamber. The separation gap is constructed to receive a flow component therein and direct it into the center of the two-part reaction chamber in a direction perpendicular to the axis of said reaction chamber to thereby chill and remove reaction products therewith through an annular collector channel which forms a centrifugal outlet nozzle in the separation gap.

The energy needed for the reaction can be supplied in the form of a heated gas stream or plasma stream from a plasma generator, or by the application of an electro-magnetic field. Preferably the energy is supplied with the aid of plasma streams. In a particularly effective embodiment, plasma (or gas) streams are supplied by two plasma generators in opposite directions at each end of the reaction vessel. The plasma streams, reactants and reaction products flowing in opposite directions impinge on each other, are radially deflected, and are removed from the separation gap through an outlet therein.

The position of the separation gap depends on the amounts supplied. If both sides are supplied equally, the separation gap is located in the middle of the vessel.

In a particularly suitable embodiment the reaction vessel is rotatably mounted and rotates during the reaction.

The reaction vessel walls are preferably cooled sufficiently for a wall coating of at least one of the reactants to be formed on the inside surfaces. Under the influence of the added energy, from plasma streams part of the wall coating is brought into the reactive condition and supplied to the reaction by evaporation by the heat of the plasma streams. It is consequently desirable for reactants to be continuously supplied from the exterior, in order to renew constantly the wall coating. For chilling and removing the reaction products the chilling medium is introduced into both parts of the reaction vessel in the immediate vicinity of the separation gap and the medium is removed together with the reaction product through said gap. The chilling medium (gas, liquid etc.) is preferably inserted so that it flows in as close as possible to the annular inner end walls of the treatment vessel, and is removed through the separation gap without flowing far into the reaction chambers. The period of mixing is thus very short and the chilling very intensive: radiation losses are small.

The device of the invention thus consists of a two-part reaction vessel with feed means for the reactants and the energy source, a separation gap between the two parts of the reaction vessel, inlets for the chilling medium in the immediate vicinity of the separation gap, and a collector channel disposed about the separation gap for the chilled reaction product.

EXAMPLE

One embodiment of the invention is shown in

Figure 2:
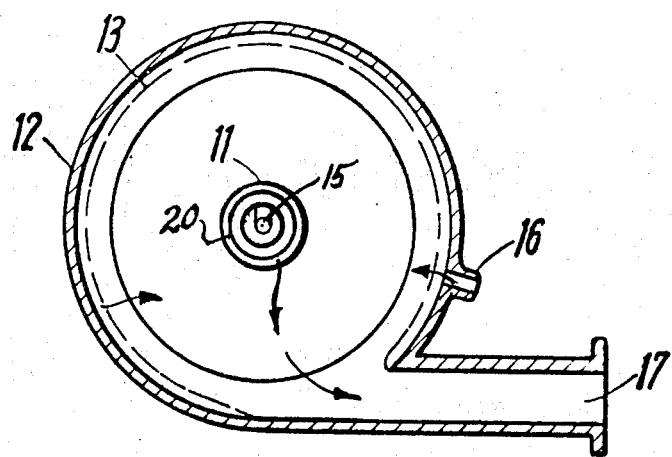

FIG. 1 which is a schematic side elevation view, partly in longitudinal section, of a rotary reaction vessel with associated plasma generator for carrying out the process of the invention; and FIG. 2 is a cross-section view through the reaction vessel in the plane of the separation gap, the view being taken substantially on line 2—2 of FIG. 1.

A rotary reaction vessel having a pair of coaxial reaction chambers 5 with hollow cooled walls 7, and driven by the drive wheels 6, from a source not shown is divided by the stationary separation gap 11. Baffle-plates 20 form the annular end walls of the chambers adjacent the separation gap and are provided for retaining the reaction material in the chambers 5. The high temperature energy for carrying out the high temperature treatment is introduced by the oppositely flowing plasma streams 14 from the plasma generator 1. The reactants or additional reaction components are fed through the tubes 15 into the plasma streams, and are therefore blown in opposite directions toward each other into the respective coaxial chambers 5 by the streams 14. The plasma streams are produced in known manner in the plasma generators 1 with rotating anodes 2 and stream feeders 3 which supply electric current to anodes 2; the chemical composition of the starting materials for the plasma streams can be selected within wide limits by the use of suitable plasma generators, depending on the reaction conditions. Part of the reactants e.g. oxide powder in the case of the vaporisation of oxides, collects from the plasma streams on the rotating internal walls of the chambers 5 and forms a cladding 19 at whose smaller inside diameter the oxide in the layer 18 melts and evaporates under the high temperature of the plasma streams 14. The cooling medium for cooling the hollow walls 7 of the coaxial reaction chambers enters and leaves the hollow wall spaces 7 via inlet and outlet apertures 9 formed between stationary sealing rings 8 that support the rotatable chambers 5. The inlets 10 for the introduction of the chilling medium are disposed between the baffles 20 and the annular collector channel 12 of the separation gap and are in the form of inlet apertures 10. The outlet 11 (centrifugal nozzle) into the annular collector channel 12 is positioned between the annular end walls 20 between the inlet apertures 10 for chilling medium. The chilling medium enters the separation gap through apertures 10 at right angles to the axis of the treatment chambers 5, flows toward the center of the separation gap close to annular end walls 20, chills the evaporated oxides collected in the separation gap from both plasma streams 14, and flows with the chilled reaction products into outlet 11 which removes the chilling medium and reaction products from the separation gap through collector channel 12. Thus, the reaction products are collected and withdrawn through the separation gap by the outlet 11 after chilling. A sieve base 13 may be effectively disposed in the annular collector channel 12 around the separation gap. Gas for preventing adhesion of the chilled products or precipitate can be fed under the sieve base 13 through the opening 16. The suspension of reaction products thus leaves the device through the outlet connecting pipe 17 of the collector channel.

I claim:

1. A device for carrying out endothermic high temperature reactions, comprising a horizontally disposed elongated, cylindrical reaction vessel, said vessel comprising two horizontally disposed, rotary, coaxial chambers and a stationary chamber connected between said rotary chambers, driving means connected to said rotary chambers for rotation thereof, said reaction vessel having opposite end walls with openings therein, means for feeding reactant material substantially coaxial in opposite directions through the openings in the end walls of said vessel into said rotary chambers, means connected adjacent said end walls for producing two plasma jets and directing them coaxially in opposite directions through the openings in the end walls of said vessel into said rotary chambers, two coaxial annular baffles on said rotary chambers each forming a boundary between said stationary chamber and one of said rotary chambers, annular means connected in said stationary chamber coaxial to and spaced from said baffles and provided with an annular central gap, inlet means in said stationary chamber between said annular means and said baffles for feeding a medium into said stationary chamber, and said annular means including an annular collector channel communicating with said annular central gap at the outer circumference thereof and having an outlet therein for reaction products.

2. A device as set forth in claim 1 in which an annular sieve is connected in said annular collector channel coaxial therewith, said sieve dividing said channel into an outer annular conduit and an inner annular conducit, said outer conduit communicating with said outlet and said inner conduit communicating circumferentially with said annular central gap.

3. A device as set forth in claim 2 including a gas inlet connected in communication with said outer conduit.

* * * * *